United States Patent
Hamann

(10) Patent No.: US 11,422,081 B2
(45) Date of Patent: Aug. 23, 2022

(54) SENSOR FOR USE IN AN EXHAUST GAS STREAM OF AN INTERNAL COMBUSTION ENGINE

(71) Applicant: CPT Group GmbH, Hannover (DE)

(72) Inventor: Christoph Hamann, Thalmassing (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 190 days.

(21) Appl. No.: 16/464,777

(22) PCT Filed: Dec. 4, 2017

(86) PCT No.: PCT/EP2017/081304
§ 371 (c)(1),
(2) Date: May 29, 2019

(87) PCT Pub. No.: WO2018/104201
PCT Pub. Date: Jun. 14, 2018

(65) Prior Publication Data
US 2019/0391062 A1    Dec. 26, 2019

(30) Foreign Application Priority Data

Dec. 7, 2016  (DE) .................... 10 2016 224 410.8

(51) Int. Cl.
*G01N 15/06* (2006.01)
*G01N 1/22* (2006.01)
*G01N 15/00* (2006.01)

(52) U.S. Cl.
CPC ....... *G01N 15/0656* (2013.01); *G01N 1/2252* (2013.01); *G01N 2015/0046* (2013.01)

(58) Field of Classification Search
CPC ............. G01N 15/0656; G01N 1/2252; G01N 2015/0046; G01N 2015/0049; G01M 15/102

(Continued)

(56) References Cited

U.S. PATENT DOCUMENTS

| 6,454,923 B1 | 9/2002 | Dodgson et al. ............. 204/415 |
| 8,713,991 B2 | 5/2014 | Allmendinger et al. .... 73/28.02 |

(Continued)

FOREIGN PATENT DOCUMENTS

| DE | 10 2005 015 103 A1 | 4/2006 | ........... G01N 27/403 |
| DE | 10 2006 006 112 A1 | 8/2007 | ............. G01N 15/06 |

(Continued)

OTHER PUBLICATIONS

German Office Action, Application No. 10 2016 224 410.8, 6 pages, dated Dec. 1, 2017.

(Continued)

*Primary Examiner* — Robert R Raevis
(74) *Attorney, Agent, or Firm* — Slayden Grubert Beard PLLC

(57) ABSTRACT

Various embodiments include a sensor for use in an exhaust gas stream of an internal combustion engine comprising: a first electrode; a second electrode electrically insulated from the first electrode by an insulation; and a connection arrangement secured to the first electrode and the insulation by a solder connection. The connection arrangement is configured to position the first electrode relative to the second electrode. The solder connection is arranged at least partly outside an electric field generated during measurement operation of the sensor by applying a first electrical potential to the first electrode and applying a second, different, electrical potential to the second electrode.

8 Claims, 2 Drawing Sheets

(58) Field of Classification Search
USPC ........... 73/23.32, 23.33, 28.01, 28.02, 31.03, 73/31.05, 865.5; 324/663, 688, 690
See application file for complete search history.

(56) References Cited

U.S. PATENT DOCUMENTS

| | | | |
|---|---|---|---|
| 2002/0072878 A1* | 6/2002 | Kanehira | G01N 17/00 702/183 |
| 2008/0202943 A1 | 8/2008 | Guenschel et al. | 205/775 |
| 2013/0219990 A1 | 8/2013 | Allmendinger et al. | 73/23.31 |
| 2018/0202914 A1* | 7/2018 | Mattmann | G01N 15/0606 |
| 2019/0064045 A1* | 2/2019 | Kiefl | G01N 15/0656 |

FOREIGN PATENT DOCUMENTS

| | | | | |
|---|---|---|---|---|
| DE | 10 2010 044 308 A1 | 3/2012 | ............ | G01N 15/06 |
| DE | 10 2015 217 794 B3 | 12/2016 | ............ | G01N 15/06 |
| EP | 2 237 018 B1 | 3/2013 | ............ | G01N 15/06 |
| WO | 2016/046229 A1 | 3/2016 | ............ | G01N 15/06 |
| WO | 2018/104201 A1 | 6/2018 | ............ | G01N 1/22 |

OTHER PUBLICATIONS

International Search Report and Written Opinion, Application No. PCT/EP2017/081304, 17 pages, dated Feb. 16, 2018.
German Office Action, Application No. 102016224410.8, 7 pages, dated Sep. 8, 2021.

\* cited by examiner

SENSOR FOR USE IN AN EXHAUST GAS STREAM OF AN INTERNAL COMBUSTION ENGINE

CROSS-REFERENCE TO RELATED APPLICATIONS

This application is a U.S. National Stage Application of International Application No. PCT/EP2017/081304 filed Dec. 4, 2017, which designates the United States of America, and claims priority to DE Application No. 10 2016 224 410.8 filed Dec. 7, 2016, the contents of which are hereby incorporated by reference in their entirety.

TECHNICAL FIELD

The present disclosure relates to internal combustion engines. Various embodiments may include sensors for use in an exhaust gas stream of an internal combustion engine and/or methods for producing same, in particular to a particle sensor used in the exhaust gas stream of an internal combustion engine and serving for determining the quantity of particles in the exhaust gas of the internal combustion engine.

BACKGROUND

Sensors for a wide variety of purposes are arranged in the exhaust gas of an internal combustion engine. By way of example, particle sensors, nitrogen oxide sensors, oxygen sensors, and/or lambda probes are typically used to detect various parameters in order to set the operating parameters of the internal combustion engine in an optimized manner. Electrical and electronic components are often used in such sensors, different electrical potentials often being applied to said components during measurement operation. Between components at which different electrical potentials are present, an electric field is generated by the different electrical potentials and may bring about in component connections, such as e.g. solder connections, so called electromigration, which can adversely influence the endurance of the component connection. Particle or gas sensors are known from U.S. Pat. No. 8,713,991 B2, DE 10 2006 006 112 A1, U.S. Pat. No. 6,454,923 B1 and EP 2 237 018 B1.

SUMMARY

The teachings of the present disclosure describe sensors which can be used in the exhaust gas of an internal combustion engine and in which the durability of at least one solder connection present within the sensor can be permanently ensured. For example, some embodiments include a sensor (100) for use in an exhaust gas stream of an internal combustion engine, wherein the sensor (100) comprises: a first electrode arrangement (130), a second electrode arrangement (140), which is electrically insulated from the first electrode arrangement (130) by means of an insulation arrangement (160), and at least one connection arrangement (170), which is secured to the first electrode arrangement (130) and the insulation arrangement (160) by means of at least one solder connection (172, 174) and is configured to position the first electrode arrangement (130) relative to the second electrode arrangement (140), wherein the at least one solder connection (172, 174) is arranged at least partly outside an electric field which is generated during measurement operation of the sensor (100) by applying a first electrical potential to the first electrode arrangement (130) and by applying a second electrical potential to the second electrode arrangement (140), said second electrical potential being different than the first potential.

In some embodiments, the first electrode arrangement (130) comprises a first sensor electrode (132) and a second sensor electrode (134), which is electrically connected to the first sensor electrode (132).

In some embodiments, the connection arrangement (170) is electrically conductive and configured to electrically connect the first sensor electrode (132) of the first sensor arrangement (130) to the second sensor electrode (134) of the first sensor arrangement (130).

In some embodiments, the second sensor electrode (134) of the first sensor arrangement (130) is fitted to the insulation arrangement (160).

In some embodiments, there is a third electrode arrangement (150), which is electrically insulated from the first electrode arrangement (130) and the second electrode arrangement (140) by means of the insulation arrangement (160) and to which a third electrical potential is applied during measurement operation of the sensor (100).

In some embodiments, the second electrode arrangement (140) comprises at least one guard electrode (142) configured to conduct away leakage currents between the first electrode arrangement (130) and the third electrode arrangement (140).

In some embodiments, the sensor is configured as an electrostatic particle sensor (100) for determining the quantity of particles in the exhaust gas stream of the internal combustion engine.

As another example, some embodiments include a method for producing a sensor (100) configured to be used in an exhaust gas stream of an internal combustion engine, wherein the method comprises: arranging a first electrode arrangement (130), arranging a second electrode arrangement (140), such that the second electrode arrangement (140) is electrically insulated from the first electrode arrangement (130) by means of an insulation arrangement (160), and positioning the first electrode arrangement (130) relative to the second electrode arrangement (140) by means of a connection arrangement (170), which is secured to the first electrode arrangement (130) and the insulation arrangement (160) by means of at least one solder connection (172, 174), wherein the at least one solder connection (172, 174) is arranged at least partly outside an electric field which is generated during measurement operation of the sensor (100) by applying a first electrical potential to the first electrode arrangement (130) and by applying a second electrical potential to the second electrode arrangement (140), said second electrical potential being different than the first electrical potential.

In some embodiments, the step of arranging a first electrode arrangement (130) comprises: arranging a first sensor electrode (132), and arranging a second sensor electrode (134), which is electrically connected to the first sensor electrode (132).

In some embodiments, the connection arrangement (170) is electrically conductive and configured to electrically connect the first sensor electrode (132) of the first electrode arrangement (130) to the second sensor electrode (134) of the first electrode arrangement (130).

BRIEF DESCRIPTION OF THE DRAWINGS

Further features and objects of the teachings of the present disclosure will become apparent to a person skilled in the art by practicing the present teaching and taking into consideration the accompanying drawings, in which.

DETAILED DESCRIPTION

Figure 1:
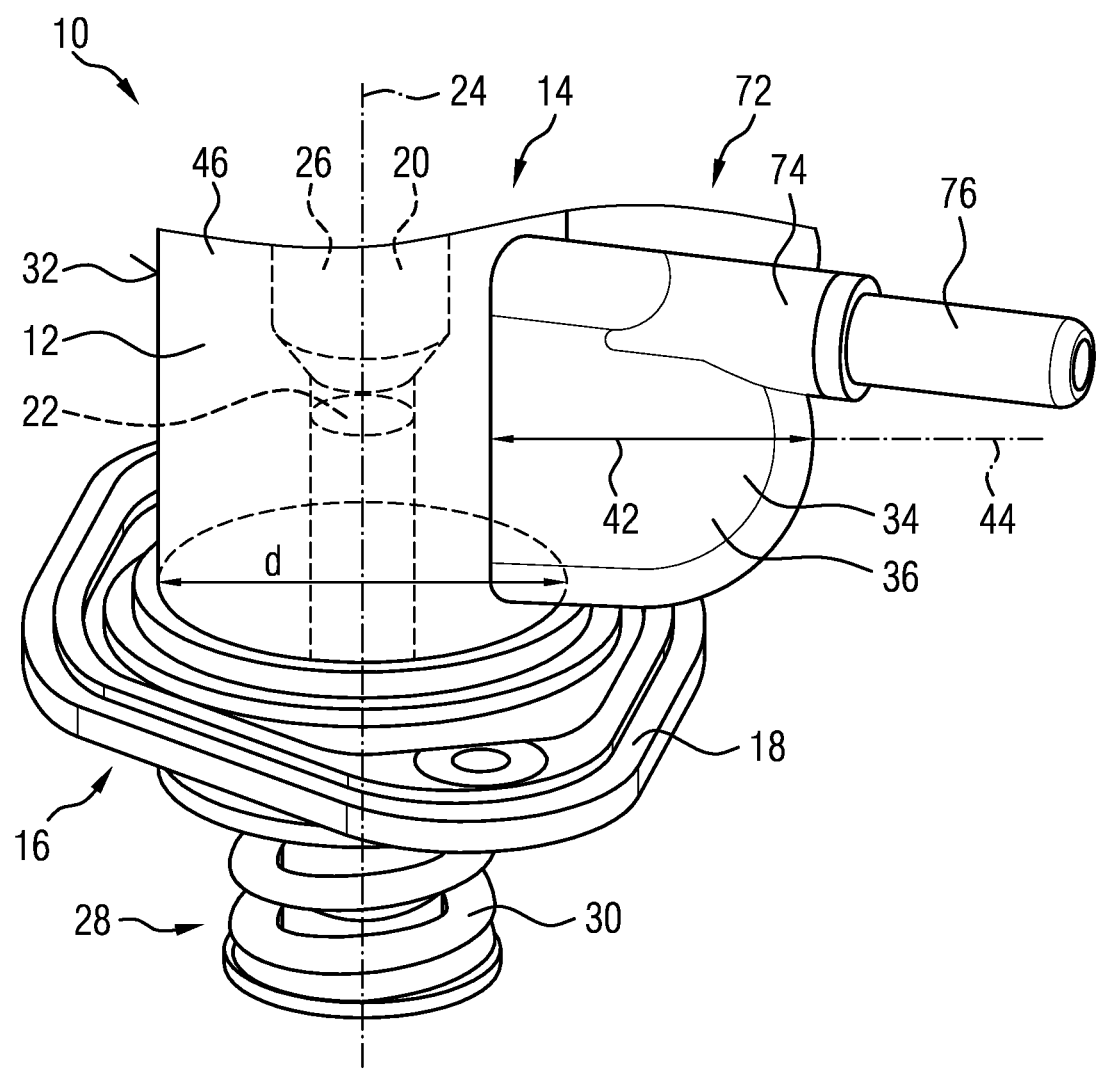
FIG. 1 shows a sectional view along a longitudinal axis through a known sensor.

In some embodiments, a sensor for use in an exhaust gas stream of an internal combustion engine comprises a first electrode arrangement, a second electrode arrangement, which is electrically insulated from the first electrode arrangement by means of an insulation arrangement, and at least one connection arrangement, which is secured to the first electrode arrangement and the insulation arrangement by means of at least one solder connection. The connection arrangement is configured to position the first electrode arrangement relative to the second electrode arrangement. The at least one solder connection is arranged outside an electric field which is generated during measurement operation of the sensor by applying a first electrical potential to the first electrode arrangement and by applying a second electrical potential to the second electrode arrangement, said second electrical potential being different than the first potential.

In some embodiments, the first electrode arrangement comprises a first sensor electrode and a second sensor electrode, which is electrically connected to the first sensor electrode. In some embodiments, there is a (further) sensor electrode, such that an electric field is displaced in such a way that possible solder connections previously arranged within such an electric field are arranged outside the latter after said (further) sensor electrode has been arranged and the electric field has been displaced. This solution is applicable to a multiplicity of different sensors. In particular, this solution finds application in sensors used in hot exhaust gases of internal combustion engines or internal combustion installations. Internal combustion engines or internal combustion installations are, for example, combustion engines for vehicles, such as automobiles, motor cycles, ships, etc., but also combined heat and power plants, refuse incineration plants or turbines.

In some embodiments, the connection arrangement is electrically conductive and configured to electrically connect the first sensor electrode of the first sensor arrangement to the second sensor electrode of the first sensor arrangement. In some embodiments, in this case, the second sensor electrode of the first sensor arrangement is fitted to the insulation arrangement.

In some embodiments, said sensor comprises a third electrode arrangement, which is electrically insulated from the first electrode arrangement and the second electrode arrangement by means of the insulation arrangement and to which a third electrical potential is applied during measurement operation of the sensor. In this case, the second electrode arrangement comprises at least one guard electrode configured to conduct away leakage currents between the first electrode arrangement and the second electrode arrangement In some embodiments, the sensor comprises an electrostatic particle sensor configured to determine the quantity of particles in the exhaust gas stream of the internal combustion engine and/or to monitor the functionality of a particle filter. Consequently, the first electrode arrangement, the second electrode arrangement, and also the third electrode arrangement, as is known for an electrostatic particle sensor, are also arranged relative to one another and electrically insulated from one another by the insulation arrangement.

In some embodiments, a method for producing a sensor configured to be used in an exhaust gas stream of an internal combustion engine comprises arranging a first electrode arrangement, arranging a second electrode arrangement, such that the second electrode arrangement is electrically insulated from the first electrode arrangement by means of an insulation arrangement, and positioning the first electrode arrangement relative to the second electrode arrangement by means of a connection arrangement, which is secured to the first electrode arrangement and the insulation arrangement by means of at least one solder connection. The at least one solder connection is arranged outside an electric field which is generated during measurement operation of the sensor by applying a first electrical potential to the first electrode arrangement and by applying a second electrical potential to the second electrode arrangement, said second electrical potential being different than the first electrical potential.

In some embodiments, the step of arranging a first electrode arrangement comprises arranging a first sensor electrode and arranging a second sensor electrode, which is electrically connected to the first sensor electrode. In some embodiments, the first sensor electrode of the first electrode arrangement and the second sensor electrode of the first electrode arrangement are arranged relative to one another in such a way that if different potentials were factiously applied between the first sensor electrode of the first electrode arrangement and the second sensor electrode of the first electrode arrangement, an electric field would be generated in which the connection arrangement together with the solder connections would be at least partly situated.

In some embodiments, the connection arrangement is electrically conductive and configured to electrically connect the first sensor electrode of the first electrode arrangement to the second sensor electrode of the first electrode arrangement.

Hereinafter, a sensor incorporating the teachings of the present disclosure is explained and illustrated on the basis of an electrostatic particle sensor, wherein the features of the present invention can also be realized in further sensors that can be used in hot exhaust gases of internal combustion engines, such as e.g. nitrogen oxide sensors, oxygen sensors or lambda probes.

FIG. 1 shows a section through a sensor known from the prior art, which sensor can be arranged for example as an electrostatic particle sensor 100 for detecting a quantity of particles in the exhaust gas of an internal combustion engine. The sensor 100 comprises a substantially cylindrical housing 110 extending substantially along a longitudinal axis 102. In further configurations, the housing 110 can be embodied in conical or stepped fashion. The housing 110 has a threaded section 112, by means of which the particle sensor 100 can be screwed into an exhaust gas duct of an internal combustion engine (not illustrated), for example. The housing 110 furthermore has a region 114, for example in the form of an exterior hexagon, to which a corresponding tool can be attached in order that the particle sensor 100 can be screwed into the exhaust gas duct of the internal combustion engine as desired.

A measurement region 120 is provided within the housing 110, said measurement region extending between a first housing region 116, which is configured, in an installed state of the particle sensor 100, to project at least partly into a gas stream (indicated by an arrow 10 in FIG. 1) flowing through the exhaust gas duct of the internal combustion engine, and a second housing region 118 substantially along the longitudinal axis 102. In particular, the first housing region 116 describes a front-end region of the housing 110 and the second housing region 118 describes a housing region of the housing 110 that is at a distance from the first housing region 116. To put it more precisely, the measurement region 120 is specified or defined by the first housing region 116 and the second housing region 118 in a direction parallel to the longitudinal axis 102.

The housing 110 further has a further housing region 119 extending along the longitudinal axis 102 and situated opposite the first housing region 116, in which further housing region is provided a contact receiving region 122, in which at least partly electrical contacts (not shown) of the particle sensor 100 can be accommodated, via which the particle sensor 100 can be connected for example to a control unit of a vehicle.

Furthermore, a first electrode arrangement 130 is arranged in the measurement region 120, said first electrode arrangement comprising a substantially cylindrical first sensor electrode 132 arranged coaxially with respect to the longitudinal axis 102. The shape of the first sensor electrode 132 is not limited to the cylindrical shape and can have any further suitable shape. The first sensor electrode 132 comprises a measurement section 133A arranged within the measurement region 120, and also a connection section 133B extending along the longitudinal axis 102 through the second housing region 118 into the contact receiving region 122, said connection section being electrically connected to the measurement section 133A. The measurement section 133A is embodied for example as a hollow cylindrical region.

The connection section 133B is configured, in particular, to produce an electrical connection of the measurement section 133A to electrical contacts (not shown) which are arranged in the contact receiving region 122 and via which the particle sensor 100 can be connected to e.g. the control unit of the vehicle.

The particle sensor 100 furthermore comprises a second electrode arrangement 140, which is electrically insulated from the first electrode arrangement 130 by means of an insulation arrangement 160, which, in the configuration illustrated in FIG. 1, is formed by way of example from three insulation elements 162, 164, 166 formed from ceramic material. The second electrode arrangement 140 comprises at least one guard electrode 142, which is electrically insulated from the first sensor electrode 132 of the first electrode arrangement 130 by means of the insulation arrangement 160. The guard electrode 142 is electrically connected via a guard connection to the electrical contacts (not shown) arranged in the contact receiving region 122.

Furthermore, the particle sensor 100 in FIG. 1 comprises a third electrode arrangement 150, which is electrically insulated from the first electrode arrangement 130 and the second electrode arrangement 140 by means of the insulation arrangement 160 and which comprises at least one sensor electrode 152 arranged in the measurement region 120 relative to the longitudinal axis 102 in a radial direction outside the first sensor electrode 132 of the first electrode arrangement 130 and coaxially with respect thereto. In further configurations, the sensor electrode 152 of the third electrode arrangement 150 can have a conical or stepped shape.

In particular, the sensor electrode 152 of the third electrode arrangement 150 is arranged around the measurement section 133A of the first sensor electrode 132 of the first electrode arrangement 130 in such a way that a first flow path 104 is formed between a radial inner wall 111 of the housing 110 and a radial outer wall 154 of the sensor electrode 152 of the third electrode arrangement 150 in such a way that the gas stream flows through the first flow path 104 from the first housing region 116 in the direction of the second housing region 118, and a second flow path 106 is formed between the first sensor electrode 132 of the first electrode arrangement 130 and the sensor electrode 152 of the third electrode arrangement 150 in such a way that the gas stream flows through the second flow path 106 from the second housing region 118 in the direction of the first housing region 116. In FIG. 1, the flow direction of the gas stream through the first flow path 104 is indicated by an arrow 12 and the flow direction through the second flow path 106 is indicated by an arrow 14.

In order that the gas stream 10 can flow through the measurement region 120, the housing 110 has in the first housing region 116 at least one inlet opening 101 and also an outlet opening 103 extending along the longitudinal axis 102.

The particle sensor 100 furthermore comprises at least one connection arrangement 170, which is secured to the first electrode arrangement 130, to put it more precisely to the first sensor electrode 132 of the first electrode arrangement 130, and the insulation arrangement 160, to put it more precisely to the insulation element 166 of the insulation arrangement 160, by means of solder connections 172, 174 (schematically illustrated as points in each case in FIG. 1). The connection arrangement 170 is configured to position the first electrode arrangement 130, to put it more precisely the first sensor electrode 132 of the first electrode arrangement 130, relative to the second electrode arrangement 140, to put it more precisely to the at least one guard electrode 142. Moreover, the connection arrangement 170, which is preferably formed from metallic material, can ensure a length compensation that arises on account of the different thermal expansions between the first electrode arrangement 130 and the insulation arrangement 160.

During measurement operation of the particle sensor 100, by means of a voltage supply (not illustrated), a first electrical potential is applied to the first electrode arrangement 130, a second electrical potential is applied to the second electrode arrangement 140 and a third electrical potential is applied to the third electrode arrangement 150. By way of example, the first electrical potential is approximately 1,000 V, the second electrical potential is approximately 1 V and the third electrical potential is approximately 0 V (that is to say that a ground potential is present at the third electrode arrangement 150).

The second electrode arrangement 140 is used primarily to stabilize the voltage conditions and electrical potentials in the particle sensor 100 and ensures that no leakage currents flow between the first electrode arrangement 130 and the third electrode arrangement 150 during measurement operation of the particle sensor 100. Leakage currents are undesired currents which flow via the insulation arrangement 160 during measurement operation of the particle sensor 10 owing to insufficient insulation properties, and thus significantly corrupt the measurement results of the particle sensor 100. As already described above, during measurement operation the second electrical potential of the second electrode arrangement 140 is set to be somewhat above the third electrical potential of the third electrode arrangement 150. As a result, leakage currents possibly present flow to the guard electrode 142 of the second electrode arrangement 140 and are conducted away there, without influencing the current measurement of the particle sensor 100. The leakage currents are made possible for example by moisture that has accumulated at the insulation arrangement 160, connecting the first electrode arrangement 130 and/or the second electrode arrangement 140 and/or the third electrode arrangement 150 to one another.

The measurement of the quantity of particles in the exhaust gas by means of such an electrostatic particle sensor 100 is known from the prior art. In the known measurement method, an electric field is generated on account of the different electrical potentials applied to the first electrode arrangement 130 and the second electrode arrangement 140, the connection arrangement 170 together with the solder connections 172, 174 being at least partially arranged in said electric field in accordance with FIG. 1. Said electric field can cause so called electromigration (also called solder migration) of the solder connections 172, 174, which can result in detachment of the connection arrangement 170 from the first electrode arrangement 130 and/or from the insulation arrangement 160. In the case of such electromigration, e.g. silver can be released from the solder connections 172, 174, and diffuses radially outward by means of the electric field.

Electromigration or solder migration arises predominantly if a plurality of electrodes, at each of which a different potential is present, are electrically connected to another by a conductive medium, e.g. liquid or conductive soot particles. As a result, the ions released at the anode deposit on the cathode and form a conductive path in the direction of the anode as a result of dendritic growth. In addition, the ions can deposit on the insulator surface as the liquid dries. Thus, the resistance value of the insulator surface can decrease and even bring about a short circuit.

Figure 2:
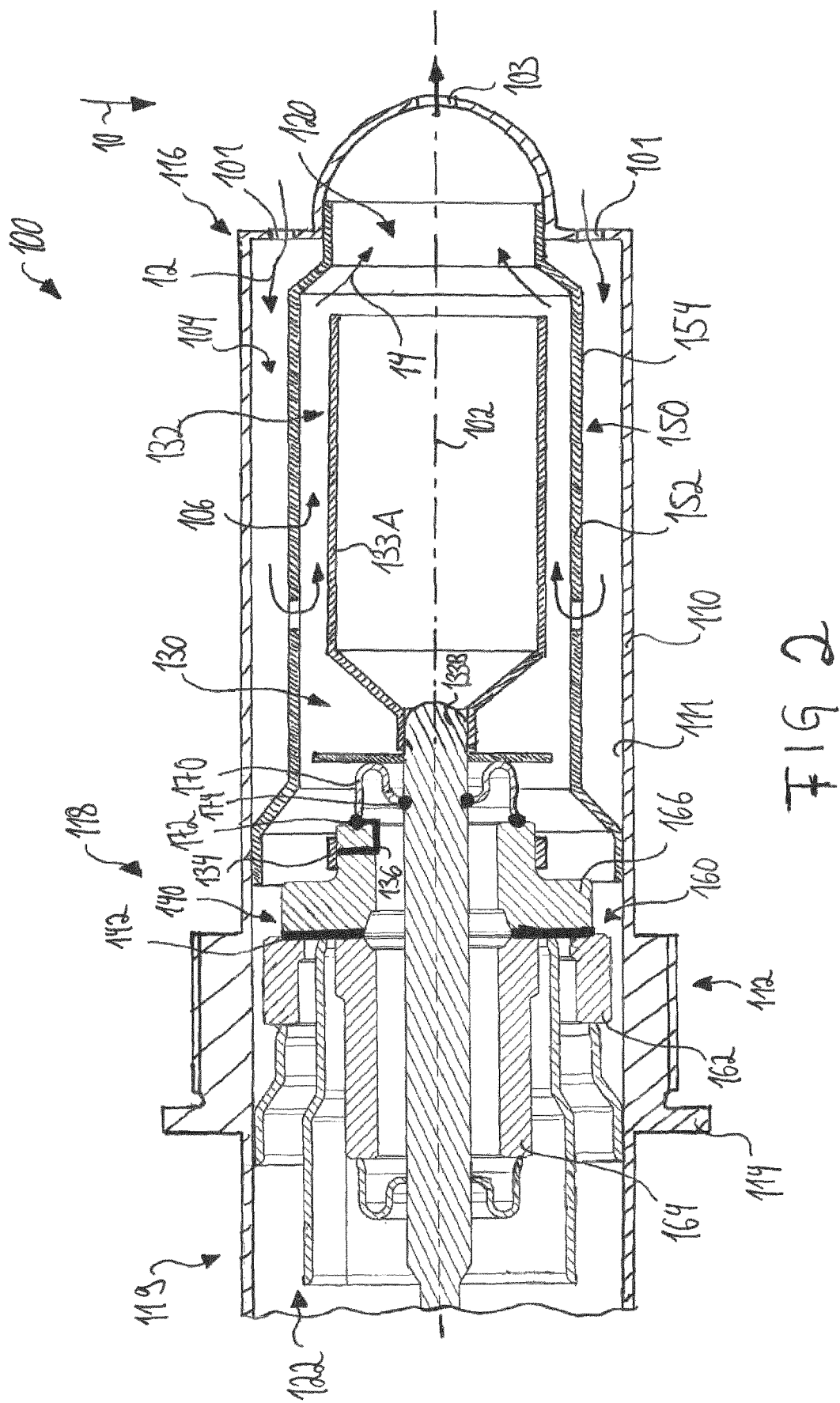
FIG. 2 shows a sectional view along a longitudinal axis through a sensor incorporating the teachings of the present disclosure.

Referring to FIG. 2, an example sensor incorporating the teachings of the present disclosure is illustrated as a particle sensor 100. The particle sensor 100 in FIG. 2 differs from the known particle sensor 100 from FIG. 1 in that the first electrode arrangement 130 furthermore comprises a second sensor electrode 134, which is electrically connected to the first sensor electrode 132 of the first electrode arrangement 130. In the embodiment illustrated in FIG. 2, the second sensor electrode 134 of the first sensor arrangement 130 is electrically connected via an electrical connection line 136 to the electrically conductive connection arrangement 170, which is in turn electrically connected to the first sensor electrode 132 of the first sensor arrangement 130.

Consequently, when the first electrical potential is applied to the first sensor electrode 132 of the first electrode arrangement 130, said first electrical potential is also present at the second sensor electrode 134 of the first electrode arrangement 130. Owing to the absence of a potential difference between the first sensor electrode 132 of the first electrode arrangement 130 and the second sensor electrode 134 of the first electrode arrangement 130, no electric field arises between the first sensor electrode 132 of the first electrode arrangement 130 and the second sensor electrode 134 of the first electrode arrangement 130.

The second sensor electrode 134 of the first electrode arrangement 130 is arranged in such a way that the connection element 170, in particular the solder connections 172, 174, lie outside the electric field generated by applying the first electrical potential to the second sensor electrode 134 of the first electrode arrangement 130 and by applying the second electrical potential to the second electrode arrangement 140. The risk of electromigration or solder migration of the solder connections 172, 174 can thus be avoided, which can result in an improvement in the endurance of said solder connections 172, 174. To put it more precisely, the second sensor electrode 134 is configured to be arranged in such a way that the solder connections 172, 174 are field free.

In the configuration shown in FIG. 2, the second sensor electrode 134 of the first electrode arrangement 130 is a substantially cylindrical ring and arranged coaxially with respect to the longitudinal axis 102. Moreover, the second sensor electrode 134 of the first electrode arrangement 130 is secured to the insulation arrangement 160 and is electrically connected to the first sensor electrode 132 of the first electrode arrangement 130 by means of the electrical connection line.

What is claimed is:

1. A sensor for use in an exhaust gas stream of an internal combustion engine, the sensor comprising:
    a first set of electrodes comprising a first sensor electrode and a second sensor electrode electrically connected to the first sensor electrode;
    a third electrode electrically insulated from the first set of electrodes by an insulation; and
    a connection arrangement secured to the first set of electrodes and the insulation by solder connections, the connection arrangement fixing the first electrode in relation to the insulation;
    wherein the solder connections are arranged at least partly outside an electric field generated during measurement operation of the sensor by applying a first ungrounded electrical potential to the first set of electrodes and applying a second ungrounded electrical potential to the third electrode, the second ungrounded electrical potential different than the first ungrounded electrical potential.

2. The sensor as claimed in claim 1, wherein the connection arrangement is electrically conductive and electrically connects the first sensor electrode to the second sensor electrode.

3. The sensor as claimed in claim 1, wherein the second sensor electrode device is fitted to the insulation.

4. The sensor as claimed in claim 1, further comprising an additional electrode electrically insulated from the first set of electrodes and the third electrode by the insulation;
    wherein a third electrical potential is applied to the additional electrode during measurement operation of the sensor.

5. The sensor as claimed in claim 4, wherein the third electrode comprises a guard electrode configured to conduct away leakage currents between the first set of electrodes and the additional electrode.

6. The sensor as claimed in claim 1, wherein the sensor comprises an electrostatic particle sensor for determining the quantity of particles in the exhaust gas stream of the internal combustion engine.

7. A method for producing a sensor for an exhaust gas stream of an internal combustion engine, the method comprising:
    arranging a first set of electrodes comprising a first sensor electrode and a second sensor electrode electrically connected to the first sensor electrode;
    arranging a third electrode so the third electrode is electrically insulated from the first set of electrodes by an insulation; and
    positioning the first electrode relative to the insulation using a connection arrangement secured to the first electrode and the insulation with a solder connection;
    wherein the solder connection is arranged at least partly outside an electric field generated during measurement operation of the sensor by applying a first ungrounded electrical potential to the first set of electrodes and applying a second ungrounded electrical potential to the third electrode, said second ungrounded electrical potential different from the first ungrounded electrical potential.

8. The method as claimed in claim 7, wherein the connection arrangement is electrically conductive and configured to electrically connect the first sensor electrode to the second sensor electrode.

* * * * *